United States Patent
Ma et al.

(10) Patent No.: US 11,770,753 B2
(45) Date of Patent: Sep. 26, 2023

(54) ADDRESS ALLOCATION METHOD, APPARATUS, CORE NETWORK, NODE, NETWORK SYSTEM AND MEDIUM

(71) Applicant: ZTE CORPORATION, Guangdong (CN)

(72) Inventors: Zijiang Ma, Shenzhen (CN); Li Yang, Shenzhen (CN); Chen Lu, Shenzhen (CN); Jianxun Ai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/062,045

(22) Filed: Oct. 2, 2020

(65) Prior Publication Data
US 2021/0176693 A1    Jun. 10, 2021

Related U.S. Application Data

(63) Continuation of application No. PCT/CN2019/079820, filed on Mar. 27, 2019.

(30) Foreign Application Priority Data

Apr. 4, 2018  (CN) .......................... 201810302076.8

(51) Int. Cl.
*H04W 76/15*    (2018.01)
*H04W 8/26*    (2009.01)
(Continued)

(52) U.S. Cl.
CPC ............. *H04W 40/24* (2013.01); *H04W 8/26* (2013.01); *H04W 48/16* (2013.01); *H04W 76/15* (2018.02); *H04W 80/04* (2013.01)

(58) Field of Classification Search
None
See application file for complete search history.

(56) References Cited

U.S. PATENT DOCUMENTS

| 2019/0124580 A1* | 4/2019 | Lu ......................... H04W 28/12 |
| 2020/0252985 A1* | 8/2020 | Vesely .................. H04W 76/15 |
| 2020/0404732 A1* | 12/2020 | Shi .......................... H04W 8/08 |

FOREIGN PATENT DOCUMENTS

| CN | 105873133 A | 8/2016 |
| CN | 106941733 A | 7/2017 |

(Continued)

OTHER PUBLICATIONS

Ericsson: "PDU Session Split at UPF" 3GPP TSG-RAN WG3 Meeting #99; R3-181266; Mar. 2, 2018; Athens, Greece (3 pages).
(Continued)

*Primary Examiner* — German Viana Di Prisco
(74) *Attorney, Agent, or Firm* — Foley & lardner LLP

(57) ABSTRACT

Provided are an address allocation method and apparatus, a core network, a node, a network system and a medium. In at least one of the case of establishing a session, at least two uplink addresses are configured and send to an access network. The access network is a connectivity network formed by a coupling of at least two network element nodes. At least part of the at least two uplink addresses are used for being allocated among the network element nodes. The access network receives the at least two uplink addresses sent by the core network and allocates the at least two uplink addresses. The access network sends at least one downlink address to the core network and determines usage of the uplink addresses. The access network may determine a correspondence between the uplink address and the downlink address. The core network receives the downlink address.

14 Claims, 8 Drawing Sheets

(51) Int. Cl.
  *H04W 40/24* (2009.01)
  *H04W 48/16* (2009.01)
  *H04W 80/04* (2009.01)

(56) References Cited

FOREIGN PATENT DOCUMENTS

| WO | WO-2011/073495 A1 | 6/2011 |
| WO | WO-2015/104345 A1 | 7/2015 |
| WO | WO-2017/078581 A1 | 5/2017 |
| WO | WO-2017/177366 A1 | 10/2017 |

OTHER PUBLICATIONS

First Office Action for CN Appl. No. 202110355591.4, dated Oct. 27, 2021 (with English translation, 15 pages).

Extended European Search Report for EP Appl. No. 19782348.7, dated Mar. 29, 2021 (9 pages).

Intel Corporation: "On multiple SCTP associations for NG-C" 3GPP TSG RAN WG3 Meeting #97bis; R3-173794; Oct. 13, 2017; Prague, Czech Republic (6 pages).

ZTE: "NGAP Impacts due to PDU Session Split over NG-U" 3GPP TSG RAN WG3 #97bis; R3-173479; Oct. 13, 2017, Prague, Czech (7 pages).

Ericsson: "PDU Session Split at UPF" 3GPP TSG-RAN WG3 Meeting #99 R3-181266, Feb. 17, 2018 (Feb. 17, 2018), Athens, Greece (3 Pages).

International Search Report and Written Opinion for PCT Appl. No. PCT/CN2019/079820 dated Jun. 21, 2019 (with English translation, 8 pages).

Technical Specification Group Radio Access Network. "Multi-connectivity" 3GPP TS 37.340 V15.0.0, Jan. 4, 2018 (Jan. 4, 2018), Valbonne, France (51 pages).

Summons to attend oral proceedings pursuant to Rule 115(1) EPC on EP Appl. No. 19782348.7, dated Feb. 16, 2023 (6 pages).

3rd Generation Partnership Project, "Technical Specification Group Radio Access Network; NG-RAN; NG Application Protocol (NGAP) (Release 15)", 3GPP TS 38.413, V0.7.0, Mar. 12, 2018 (8 pages).

First Office Action on JP Appl. No. 2020-554083, dated Feb. 14, 2023 (with English translation, 8 pages).

* cited by examiner

ADDRESS ALLOCATION METHOD, APPARATUS, CORE NETWORK, NODE, NETWORK SYSTEM AND MEDIUM

CROSS-REFERENCE TO RELATED APPLICATIONS

This application claims the benefit of priority under 35 U.S.C. § 120 as a continuation of PCT Patent Application No. PCT/CN2019/079820, filed on Mar. 27, 2019, which claims priority to Chinese patent application No. CN201810302076.8 filed on Apr. 4, 2018, the disclosure of each of which is incorporated herein by reference in its entirety.

TECHNICAL FIELD

Embodiments of the present application relate to the field of communications and, for example, to an address allocation method and apparatus, a core network, a network element node, a network system and a medium.

BACKGROUND

In a related access network, a network mode in which two base stations are tightly coupled to jointly provide a communication service to a user equipment (UE) is called a dual-connectivity (DC) network. FIG. 1 is an architecture diagram of a DC network in the related art. As shown in FIG. 1, the two base stations are divided into a master node (MN), also called a first network element (M-NG-RAN node) and a secondary node (SN), also called a second network element (S-NG-RAN node). The design of the dual-connectivity network can increase the communication capacity of a session. One packet data unit session (PDU session), referred to as a session, may include at least one quality of service flow (QoS flow). The core network may establish three types of PDU sessions for this session. The three types of PDU sessions are described below.

Type 1: a splitting PDU session, referred to as splitting session: this session is split such that part of the QoS flows are terminated at the MN node (M-NG-RAN node) and the rest of the QoS flows are terminated at the SN node (S-NG-RAN node).

Type 2: a non-splitting PDU session terminated at MN, also called a non-splitting PDU session anchored at MN: this session is not split and all QoS flows of this session are at MN.

Type 3: a non-splitting PDU session terminated at SN, also called a non-splitting PDU session anchored at SN: this session is not split and all QoS flows of this session are at MN.

Regarding the preceding three types of sessions, in the related art, difficulties occur in practical application for lack of logic of allocation of uplink addresses between a core network and an access network in the preceding three types of sessions.

SUMMARY

The following is a summary of the subject matter described herein in detail. This summary is not intended to limit the scope of the claims.

Embodiments of the present application provide an address allocation method and apparatus, a core network, a network element node, a network system and a medium to alleviate lack of the configuration scheme of uplink addresses between a core network and an access network in the related art in the case where the access network is a connectivity network formed by a coupling of multiple base stations.

An embodiment of the present application provides an address allocation method. The method includes following steps: in at least one of the case of establishing a session or the case of modifying a session, at least two uplink addresses are configured and the at least two uplink addresses are sent to an access network, where the access network is a connectivity network formed by a coupling of at least two network element nodes and part or all of the at least two uplink addresses are used for being allocated among the at least two network element nodes; and receiving a downlink address sent by the access network is received and usage of the at least two uplink addresses and a correspondence between a used uplink address and the downlink address are determined.

An embodiment of the present application further provides an address allocation method. The method includes following steps: in at least one of the case of establishing a session or the case of modifying a session, at least two uplink addresses sent by a core network are received; the at least two uplink addresses are allocated among at least two network element nodes composing an access network, where the access network is a connectivity network formed by a coupling of at least two network element nodes; and a downlink address is sent to the core network and usage of the at least two uplink addresses and a correspondence between a used uplink address and the downlink address are determined.

An embodiment of the present application further provides an address allocation method. The method includes following steps: in at least one of the case of establishing a session or the case of modifying a session, a core network configures at least two uplink addresses and sends the at least two uplink addresses to an access network, where the access network is a connectivity network formed by a coupling of at least two network element nodes and at least part of the at least two uplink addresses are used for being allocated among the at least two network element nodes; the access network receives the at least two uplink addresses sent by the core network and allocates the at least two uplink addresses among multiple network element nodes composing the access network; the access network sends a downlink address to the core network and determines usage of the at least two uplink addresses and a correspondence between a used uplink address and the downlink address; and the core network receives the downlink address sent by the access network.

An embodiment of the present application further provides an address allocation apparatus. The apparatus includes a core configuration module and an address reception module. The core configuration module is configured to, in at least one of the case of establishing a session or the case of modifying a session, configure at least two uplink addresses and send the at least two uplink addresses to an access network, where the access network is a connectivity network formed by a coupling of at least two network element nodes and at least part of the at least two uplink addresses are used for being allocated among the at least two network element nodes. The address reception module is configured to receive a downlink address sent by the access network and determine usage of the at least two uplink addresses and a correspondence between a used uplink address and the downlink address.

An embodiment of the present application further provides an address allocation apparatus. The apparatus includes an address acquisition module, an address allocation module and an address sending module. The address acquisition module is configured to, in at least one of the case of establishing a session or the case of modifying a session, receive at least two uplink addresses sent by a core network. The address allocation module is configured to allocate the at least two uplink addresses among at least two network element nodes composing an access network, where the access network is a connectivity network formed by a coupling of at least two network element nodes. The address sending module is configured to send a downlink address to the core network and determine usage of the at least two uplink addresses and a correspondence between a used uplink address and the downlink address.

An embodiment of the present application further provides a core network. The core network includes a first processor and a first memory coupled to each other. An address allocation program is stored in the first memory. The first processor is configured to execute the address allocation program stored in the first memory to perform the steps of the preceding address allocation method.

An embodiment of the present application further provides a network element node. The access network is a connectivity network formed by a coupling of at least two network element nodes. The access network includes a second processor and a second memory coupled to each other. An address allocation program is stored in the second memory. The second processor is configured to execute the address allocation program stored in the second memory to perform the steps of the preceding address allocation method.

An embodiment of the present application further provides a network system. The network system includes a core network and an access network. The access network is a connectivity network formed by a coupling of at least two network element nodes. In at least one of the case of establishing a session or the case of modifying a session, the core network configures at least two uplink addresses and sends the at least two uplink addresses to the access network, where part or all of the at least two uplink addresses are used for being allocated among the at least two network element nodes. The access network receives the at least two uplink addresses sent by the core network and perform, according to the at least two uplink addresses, uplink-address allocation among the at least two network element nodes composing the access network. The access network sends a downlink address to the core network and determines usage of the at least two uplink addresses and a correspondence between a used uplink address and the downlink address. The core network receives the downlink address sent by the access network.

An embodiment of the present application further provides a computer-readable storage medium storing at least one computer program. The at least one computer program is executable by at least one processor to perform the steps of the preceding address allocation method.

Other aspects can be understood after the drawings and the detailed description are read and understood.

DETAILED DESCRIPTION

Embodiments of the present application will be further described below in detail by use of implementations and with reference to the drawings. It is to be understood that the embodiments described herein are merely intended to explain the present application and not to limit the present application.

Communication networks in the related art have a widely-deployed fourth generation (4G) communication system and an initially-deployed fifth generation (5G) communication system. A core network of a 4G system is an Evolved Packet Core (EPC). An Evolved Node B (eNB) using Evolved Universal Terrestrial Radio Access (E-UTRA) at a wireless interface is deployed in a radio access network (RAN, simply referred to as an access network in the embodiments of the present application) of the 4G system. A core network of a 5G system is a 5G core network (5GC). A next generation eNB (ng-eNB) as well as a generation Node B (gNB) using new radio (NR) access at a wireless interface are deployed in an RAN of the 5G system.

Figure 1:
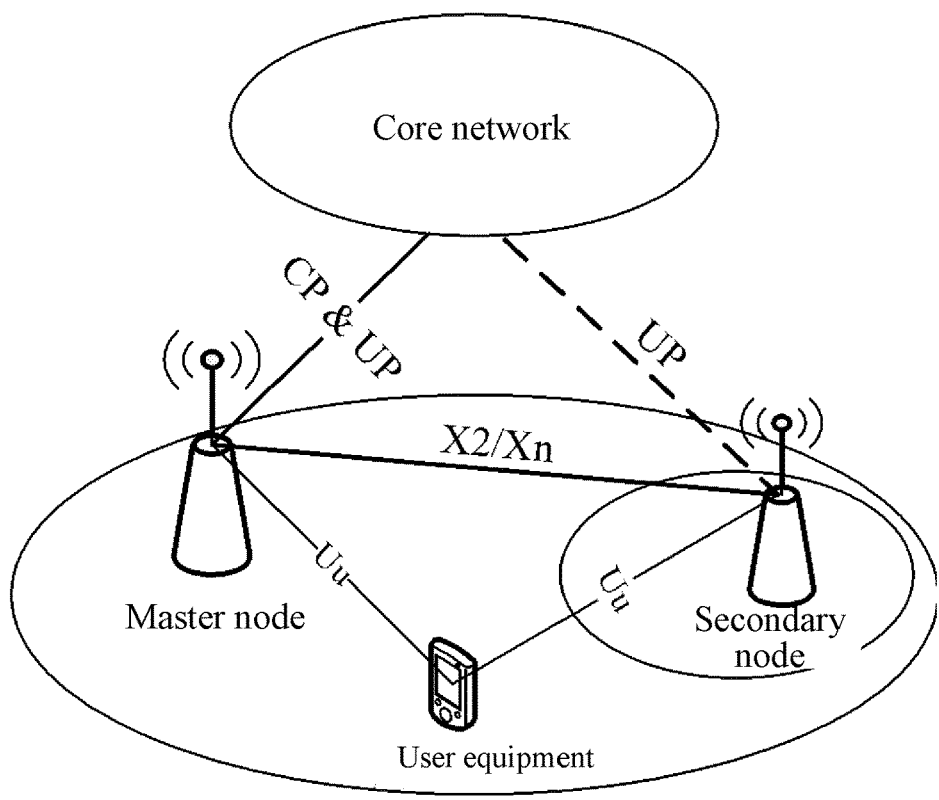
FIG. 1 is an architecture diagram of a dual-connectivity network according to an embodiment of the present application.
Figure 2:
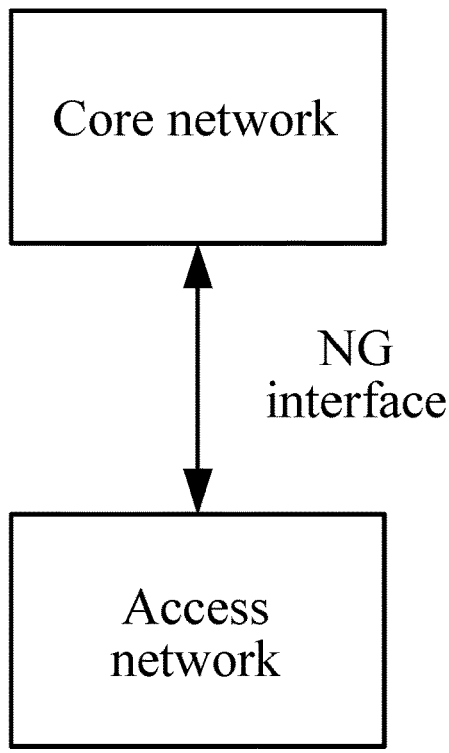
FIG. 2 is an architecture diagram illustrating connection between a core network and an access network according to an embodiment of the present application.

In a network architecture, an interface between a core network and an access network is an NG interface. User-plane data transmitted over the NG interface is called NG user data (NG-U data). The NG-U data includes downlink NG-U data sent from the core network to the access network and uplink NG-U data sent from the access network to the core network, referring to FIG. 2.

Figure 3:
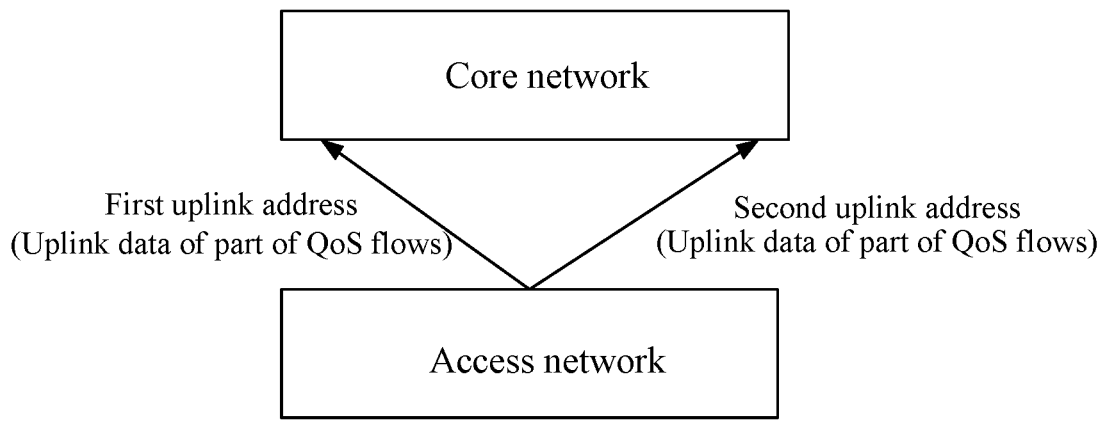
FIG. 3 is a schematic diagram illustrating allocation of uplink addresses to a session according to an embodiment of the present application.

One session (PDU session) includes at least one QoS flow. In the case where the core network provides two uplink addresses for a certain session (PDU session), the NG-RAN may send the uplink NG-U data of part of the QoS flows to the core network thorough one uplink address and send uplink NG-U data of the rest of the QoS flows to the core network thorough another uplink address. The uplink addresses are configured in an information element (IE) of transport layer information. The two uplink addresses are simply referred to as a first uplink address and a second uplink address in the embodiments of the present application. The uplink address is also called a General Packet Radio Service Tunneling Protocol tunnel (GTP tunnel) and includes a transport layer address and a tunnel endpoint (GTP-TEID), as shown in FIG. 3.

The access network in the embodiments of the present application refers to a connectivity network formed by a coupling of at least two network element nodes. In the case where the access network is formed by a coupling of two network element nodes, the access network is called a dual-connectivity network. Such an access network may allow the establishment of a larger-capacity session, that is, may allow the creation of more session content, simultaneously. The QoS flows of one session may be processed by using different uplink addresses of multiple base stations, that is, at least two network element nodes, in the access network.

The used downlink address mentioned in the embodiments of the present application means that the core network transmits downlink data through this downlink address, that is, the core network sends the downlink data to this downlink address. The used downlink address is also called an occupied downlink address. The used uplink address mentioned in the embodiments of the present application means that the access network transmits uplink data through this uplink address, that is, the access network sends the uplink data to this uplink address. The used uplink address is also called an occupied uplink address.

Figure 4:
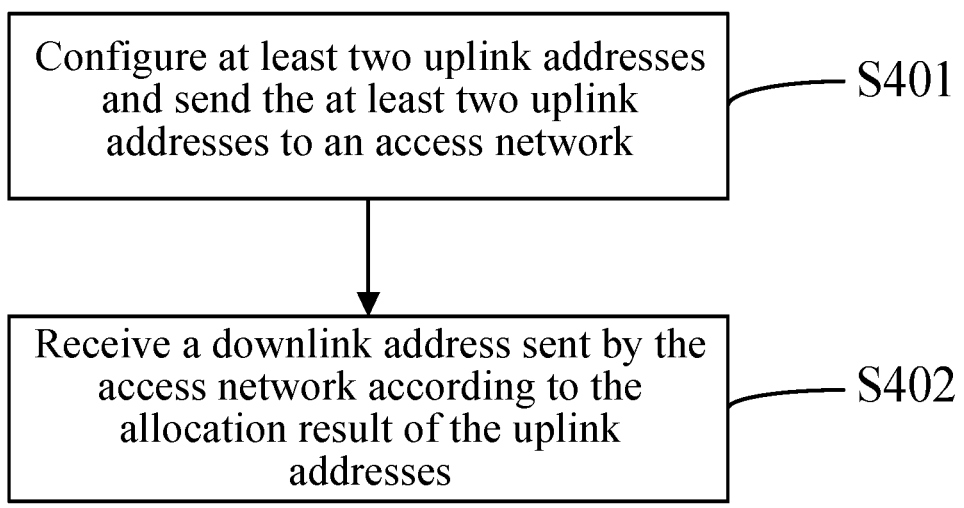
FIG. 4 is a flowchart of an address allocation method according to an embodiment of the present application.

Referring to FIG. 4, FIG. 4 is a flowchart of an address allocation method according to an embodiment of the present application. The method includes steps S401 and S402.

In step S401, in at least one of the case of establishing a session or the case of modifying a session, at least two uplink addresses are configured and sent to an access network. The access network is a connectivity network formed by a coupling of at least two network element nodes. Part or all of the at least two uplink addresses are used for being allocated among the at least two network element nodes.

In step S402, a downlink address sent by the access network is received and usage of the at least two uplink addresses and a correspondence between a used uplink address and the downlink addresses are determined.

For the access network formed based on the connectivity network formed by a coupling of multiple network element nodes, not only session splitting is achieved, a non-splitting session can also be reserved. That is, in the access network, QoS flows of one session may also be processed through one uplink address of one network element node.

In step S401, in at least one of the case of establishing a session or the case of modifying a session, the at least two uplink addresses are configured and sent to the access network. At least one of the case of establishing a session or the case of modifying a session means a trigger occasion of the address allocation method in this embodiment. The expression "in the case of establishing a session or the case of modifying a session" means that in the whole process of establishing a session or modifying a session, the steps of the address allocation method in this embodiment are performed. Establishing a session means creating a new session, such as a network request newly initiated by a user. This session does not exist in the previous network. Modifying a session means that the session existed before, but for some reasons, the type of the session or the related parameter of the session needs to be modified. The reasons include such a trigger occasion: due to network deterioration, it is needed to process the QoS flows of the session through only one network element node to improve stability, or due to an increase in the QoS flows of the session, it is needed to switch an originally non-splitting session to a splitting session to increase the capacity of the session. At least one of the session establishment occasion or the session modification occasion may be initiated by the core network, may be initiated by a user equipment according to actual needs or may be initiated by the access network. This is not limited in this embodiment. Any trigger condition is feasible in this embodiment.

Configuring at least two uplink addresses means that the core network obtains at least two uplink addresses in any manner. For example, the core network may obtain the uplink addresses by selecting the uplink addresses randomly or logically from an address pool or may generate the uplink addresses by a function entity such as a system management function (SMF) of the core network. The at least two uplink addresses are selected according to provided uplink addresses, selected according to the type and sequence of the session or selected randomly from related uplink addresses so as to be allocated by the access network. The number of uplink addresses provided by the core network may be greater than or equal to the number of network element nodes coupled in the access network, so that in any session type, it can be ensured that the uplink addresses are enough for allocation. Of course, not all addresses in the uplink addresses provided by the core network are allocated by the access network. The access network determines the number of uplink addresses and the corresponding allocation mode according to at least one of the type of an established session or the type of a modified session. If the type of the session is a splitting session, the number of uplink addresses needs to be greater than or equal to 2. If the type of the session is a non-splitting session, only one uplink address is needed. That is, at least part of the uplink addresses is used for being allocated among the network element nodes. At least part may be part or all of the at least two uplink addresses.

In step S402, the downlink address sent by the access network is received. After receiving the uplink address sent by the core network, the access network may perform uplink-address allocation according to the type of the session, thereby creating the corresponding session, modifying the corresponding session, and creating and modifying the corresponding session. In an embodiment, the step in which the downlink address sent by the access network is received includes following steps: in response to determining that the session is a splitting session and the session is configured on at least two network element nodes, the downlink addresses sent by the access network and used by the at least two network element nodes configured with the session is received; and, in response to determining that the session is a non-splitting session and the session is configured on any one network element node, the downlink address sent by the access network and used by the any one network element node configured with the session is received. The expression "in response to determining that the session is a splitting session" means that the QoS flows of the session may interact with the core network through multiple network element nodes. In this case, it is needed to determine, according to the network element nodes that have been allocated uplink addresses, the downlink addresses used by these network element nodes. These downlink addresses correspond to the uplink addresses used by these network element nodes. If the session is a non-splitting session, information interaction in the session is implemented through only one network element node of the access network and the downlink address used by this network element node needs to be determined according to this network element node. This downlink address corresponds to the uplink address used by this network element node. One and the same network element node may carry multiple different sessions simultaneously. Correspondingly, one and the same network element node may also carry multiple different session types simultaneously. For example, if session A is a splitting session, network element node N may be served as an anchor in the splitting session and be allocated uplink address A and corresponding downlink address A; if session B is a non-splitting session and configured on network element node N, network element node N may also carry session B at the same time and be allocated uplink address B and corresponding downlink address B. Uplink address A and uplink address B may exist on one and the same network element node simultaneously. The same goes to downlink address A and downlink address B. The downlink address used by a network element node mentioned in this embodiment of the present application means that the core network transmits downlink data to the access network through this downlink address. The used downlink address is also called an occupied downlink address.

In an embodiment, the step in which in response to determining that the session is a non-splitting session and the session is configured on any one network element node, the downlink address used by the network element node is received includes following steps: in response to determining that the session is a non-splitting session and the session is configured on a master node, the downlink address used by the master node is received; and, in response to determining that the session is a non-splitting session and the session is configured on a secondary node, the downlink address used by the secondary node is received. The types of network element nodes in the access network are divided into two types: a master node and a secondary node. The secondary node and the core network only perform interaction of user data, while the master node and the core network may perform interaction of control data as well as interaction of user data. In one core network, coupled network element nodes include at least one master node and other network element nodes, where the other network element nodes are secondary network element nodes. Generally, only one master node is provided and interaction of control signaling between the secondary nodes and the core network is performed through the master node. If the session is a non-splitting session anchored at a master node, the downlink address used by the master node is received. If the session is a session anchored at a secondary node, the downlink address used by the secondary node is received. In the case of receiving the downlink address used by the secondary node, the secondary node first sends the downlink address to the master node and then the master node sends the downlink address to the core network.

In an embodiment, the step in which the downlink address sent by the access network is received may further include a following step: a downlink address used by the network element node and the corresponding uplink address. In one session, the uplink address used by the network element node corresponds to the downlink address used by the network element node, and the access network may allocate the uplink addresses according to the order in which the uplink addresses are ranked, that is, according to such an order: the first uplink address, the second uplink address, . . . determined by the core network. In this case, the core network only needs to know the downlink addresses used by the network element nodes allocated the uplink addresses. The access network may also allocate the uplink addresses randomly, that is, randomly select an uplink address from uplink addresses and allocate this uplink address. In this case, the core network needs to know the usage of the uplink addresses and the correspondence between the uplink addresses and the downlink addresses sent by the core network. The usage of the uplink addresses includes at least the uplink address that has been allocated among the uplink addresses sent by the core network. Correspondingly, the uplink address that has not been allocated may also be learned. The correspondence between the uplink address and the downlink address is the correspondence between the uplink address and the downlink address used by the network element node that has been allocated the uplink address. For example, the step in which the usage of the uplink addresses and the correspondence between the uplink address and the downlink address may include a following step: the usage of the uplink addresses and the correspondence between the uplink address and the downlink address according to a preset mapping relation between uplink addresses and downlink addresses and the number of received downlink addresses. The preset mapping relation between the uplink addresses and the downlink addresses may be a one-to-one mapping relation between the uplink addresses and the downlink addresses, where the uplink addresses are sequentially mapped onto the downlink addresses. For example, the first uplink address is mapped onto the first downlink address, the second uplink address is mapped onto the second downlink address, . . . . Then, after the access network performs the allocation, the core network may determine the usage of the uplink addresses and the correspondence between the uplink addresses and the downlink addresses according to the number of downlink addresses sent by the access network. For example, the core network receives a downlink address sent by the access network, it may be known that only the first uplink address is allocated by the access network and the first uplink address corresponds to the first downlink address.

In an embodiment, the at least two network element nodes include at least one master node and a network element node, except for the at least one master node, where the network element node is a secondary node. Multiple network element nodes configured with the session may include one master node and at least one secondary node. The step in which the at least two uplink addresses are sent to the access network may include a following step: the at least two uplink addresses are sent to the master node. Correspondingly, the step in which the downlink address sent by the access network is received may include a following step: the downlink address sent by the master node is received. That is, the access network performs the interaction of control signaling with the core network through the master node, and the control instruction of the secondary node is sent to the core network also through the master node.

In an embodiment, after the downlink addresses sent by the access network based on the uplink addresses are received, the address allocation method further includes following steps: release notification information sent by the access network is received, where the release notification information includes identification information of an uplink address allocated to the network element node or identification information of an uplink addresses not allocated to the network element node; and the uplink address not allocated to the network element node is released according to the release notification information. After the core network sends the uplink addresses to the access network and the access network performs the allocation, the access network does not necessarily use up all the uplink addresses sent by the core network. For the uplink addresses not used by the access network, the core network may release these uplink addresses for later use or for being used by other sessions. To learn the uplink addresses to be released, the core network may receive the release notification information sent by the access network. The release notification information may include the identification information of the allocated uplink address or the identification information of the not allocated uplink address.

The identification information of the allocated uplink address may refer to the allocated uplink address itself or may refer to the identification information that may characterize the allocated uplink address. The same goes to the identification information of the not allocated uplink address. It is worth mentioning that, in the case where the access network sequentially allocates the uplink addresses sent by the core network to the at least two network element nodes in the access network, the core network can determine the allocated uplink address according to the usage of the downlink address in the access network sent by the access network, so that the core network can determine and then release the uplink address not allocated to the network element node, thereby saving network resources.

This embodiment provides the address allocation method to alleviate lack of the allocation scheme of uplink addresses between a core network and an access network in the related art. In at least one of the case of establishing a session or the case of modifying a session, the core network configures at least two uplink addresses and sends the at least two uplink addresses to the access network. The access network is a connectivity network formed by a coupling of at least two network element nodes. At least part of the at least two uplink addresses are used for being allocated among the at least two network element nodes. The access network receives the at least two uplink addresses sent by the core network and allocates the at least two uplink addresses among the at least two network element nodes composing the access network. The access network sends a downlink address to the core network according to an allocation result and determines usage of the uplink addresses and a correspondence between the uplink addresses and the downlink addresses, and the core network receives the downlink address. Thus, allocation of uplink addresses is implemented between the core network and the access network formed by the coupling of the at least two network element nodes.

Figure 5:
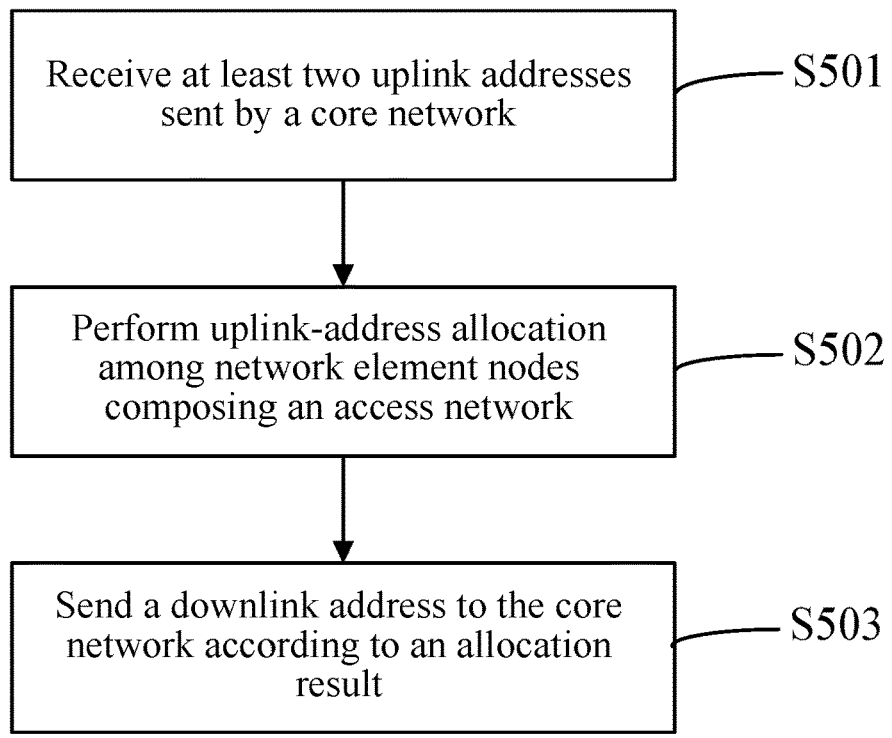
FIG. 5 is a flowchart of an address allocation method according to another embodiment of the present application.

Referring to FIG. 5, FIG. 5 is a flowchart of an address allocation method according to an embodiment of the present application. The method includes steps S501 to S503.

In step S501, in at least one of the case of establishing a session or the case of modifying a session, at least two uplink addresses sent by a core network are received.

In step S502, uplink-address allocation is performed among network element nodes composing an access network according to the at least two uplink addresses. The access network is a connectivity network formed by a coupling of at least two network element nodes.

In step S503, a downlink address is sent to the core network and usage of the at least two uplink addresses and a correspondence between a used uplink address and the downlink address are determined.

At least one of the case of establishing a session or the case of modifying a session means a trigger occasion of the address allocation method in this embodiment. The expression "in the case of establishing a session or the case of modifying a session" means that in the whole process of establishing a session or modifying a session, the steps of the address allocation method in this embodiment are performed. Establishing a session means creating a new session, such as a network request newly initiated by a user. This session does not exist in the previous network. Modifying a session means that the session existed before, but for some reasons, the type of the session or the related parameter of the session needs to be modified. The reasons include such a trigger occasion: due to network deterioration, it is needed to process the QoS flows of the session through only one network element node to improve stability, or due to an increase in the QoS flows of the session, it is needed to switch an originally non-splitting session to a splitting session to increase the capacity of the session. At least one of the session establishment occasion or the session modification occasion may be initiated by the core network, may be initiated by a user equipment according to actual needs or may be initiated by the access network. This is not limited in this embodiment. Any trigger condition is feasible in this embodiment.

The number of uplink addresses provided by the core network may be greater than or equal to the number of network element nodes coupled in the access network, so that in any session type, it can be ensured that the uplink addresses are enough for allocation. Of course, not all addresses in the uplink addresses provided by the core network are allocated by the access network. The access network determines the number of uplink addresses and the corresponding allocation mode according to at least one of the type of an established session or the type of a modified session. If the type of the session is a splitting session, the number of uplink addresses needs to be greater than or equal to 2. If the type of the session is a non-splitting session, only one uplink address is needed. That is, at least part of the uplink addresses is used for being allocated among the network element nodes. At least part may be part or all of the at least two uplink addresses.

In an embodiment, the step in which the uplink-address allocation is performed among the network element nodes composing the access network according to the at least two uplink addresses includes following steps: in response to determining that the session is a splitting session and the session is configured on at least two network element nodes, one uplink address is allocated to each of the at least two network element nodes configured with the session; and, in response to determining that the session is a non-splitting session and the session is configured on any one network element node, one uplink address is allocated to the any one network element node configured with the session. The expression "in response to determining that the session is a splitting session" means that the QoS flows of the session may interact with the core network through multiple network element nodes, thus the mode of allocating uplink addresses is that each of the multiple network element nodes configured with the session is allocated one uplink address. The expression "in response to determining that the session is a non-splitting session" means that the network element node configured with the session is allocated one uplink address.

In an embodiment, the mode of allocating one uplink address to a network element node may include that randomly selecting one uplink address from the at least two uplink addresses and performing allocation, or performing allocation according to an order in which the at least two uplink addresses are ranked.

In an embodiment, the at least two network element nodes may include at least one master node and a network element node, except for the at least one master node, where the network element node is a secondary node. The at least two network element nodes configured with the session include one master node and at least one secondary node. The network element node configured with the session includes one master node or one secondary node. That is, in the case where the session is a splitting session, the network element nodes configured with the session may include the master node and the secondary node. The uplink addresses may be allocated in the manner of random selection from uplink addresses, or may be allocated according to the "from master node to secondary node" order and the order in which multiple uplink addresses in the uplink addresses are ranked.

In an embodiment, the step in which one uplink address is randomly selected from the at least two uplink addresses and the allocation is performed, or the allocation is performed according to the order in which the at least two uplink addresses are ranked includes following steps: in response to determining that the session is a non-splitting session and the session is configured on a secondary node, any one of the at least two uplink addresses is randomly allocated to the secondary node; or the uplink address ranked first among the at least two uplink addresses is allocated to the secondary node. Correspondingly, in this embodiment, the step in which the downlink address is sent to the core network includes following steps: in response to determining to randomly allocating any one of the at least two uplink addresses to the secondary node, the downlink address of the secondary node and the corresponding uplink address are sent to the core network; and, in response to determining to allocating the uplink address ranked first among the at least two uplink addresses to the secondary node, only the downlink address of the secondary node is sent to the core network.

In an embodiment, the address allocation method further includes a following step: release notification information is sent to the core network, where the release notification information includes identification information of an uplink address allocated to the network element node or identification information of an uplink address not allocated to the network element node, and the release notification information is used for the core network to release the uplink address not allocated to the network element node. After the core network sends the uplink addresses to the access network and the access network performs the allocation, the access network does not necessarily use up all the uplink addresses sent by the core network. For the uplink addresses not used by the access network, the core network may release these uplink addresses for later use or for being used by other sessions. To learn the uplink addresses to be released, the core network may receive the release notification information sent by the access network. The release notification information may include the identification information of the allocated uplink address or the identification information of the not allocated uplink address. The identification information of the allocated uplink address may refer to the allocated uplink address itself or may refer to the identification information that may characterize the allocated uplink address. The same goes to the identification information of the not allocated uplink address. It is worth mentioning that, in the case where the access network sequentially allocates the uplink addresses sent by the core network to the at least two network element nodes in the access network, the core network can determine the allocated uplink address according to the usage of the downlink address in the access network sent by the access network, so that the core network can determine and then release the uplink address not allocated to the network element node, thereby saving network resources.

In an embodiment, the at least two network element nodes may include at least one master node and a network element node, except for the at least one master node, where the network element node is a secondary node. The step in which the at least two uplink addresses sent by the core network are received includes a following step: the master node receives the at least two uplink addresses sent by the core network. The step in which the uplink-address allocation is performed among the network element nodes composing the access network according to the at least two uplink addresses includes a following step: the master node performs the uplink-address allocation among the network element nodes composing the access network according to the at least two uplink addresses. The step in which the downlink address is sent to the core network according to the allocation result includes a following step: the master node sends the downlink address to the core network according to the allocation result. That is, the access network performs the interaction of control signaling with the core network through the master node in the access network, and the control instruction of the secondary node is sent to the core network also through the master node.

This embodiment provides the address allocation method to alleviate lack of the allocation scheme of uplink addresses between a core network and an access network in the related art. In at least one of the case of establishing a session or the case of modifying a session, the core network configures at least two uplink addresses and sends the at least two uplink addresses to the access network. The access network is a connectivity network formed by a coupling of at least two network element nodes. At least part of the at least two uplink addresses are used for being allocated among the at least two network element nodes. The access network receives the at least two uplink addresses sent by the core network and allocates the at least two uplink addresses among the at least two network element nodes composing the access network. The access network sends a downlink address to the core network according to an allocation result, and the core network receives the downlink address. Thus, allocation of uplink addresses is implemented between the core network and the access network formed by the coupling of the at least two network element nodes.

Figure 6:
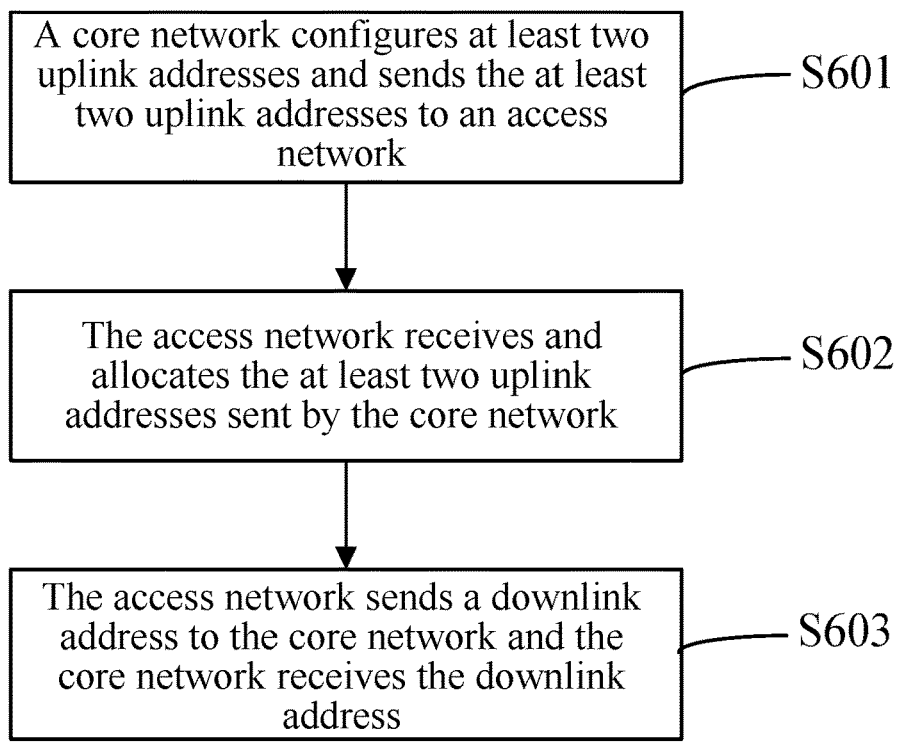
FIG. 6 is a flowchart of an address allocation method according to another embodiment of the present application.

Referring to FIG. 6, FIG. 6 is a flowchart of an address allocation method according to an embodiment of the present application. The method includes steps S601 to S603.

In step S601, in at least one of the case of establishing a session or the case of modifying a session, a core network configures at least two uplink addresses and sends the at least two uplink addresses to an access network. The access network is a connectivity network formed by a coupling of at least two network element nodes. Part or all of the at least two uplink addresses are used for being allocated among the at least two network element nodes.

In step S602, the access network receives the at least two uplink addresses sent by the core network and performs uplink-address allocation among the at least two network element nodes composing the access network according to the at least two uplink addresses.

In step S603, the access network sends a downlink address to the core network and determines usage of the at least two uplink addresses and a correspondence between a used uplink address and the downlink address, and the core network receives the downlink address sent by the access network.

At least one of the case of establishing a session or the case of modifying a session means a trigger occasion of the address allocation method in this embodiment. The expression "in the case of establishing a session or the case of modifying a session" means that in the whole process of establishing a session or modifying a session, the steps of the address allocation method in this embodiment are performed. Establishing a session means creating a new session, such as a network request newly initiated by a user. This session does not exist in the previous network. Modifying a session means that the session existed before, but for some reasons, the type of the session or the related parameter of the session needs to be modified. The reasons include such a trigger occasion: due to network deterioration, it is needed to process the QoS flows of the session through only one network element node to improve stability, or due to an increase in the QoS flows of the session, it is needed to switch an originally non-splitting session to a splitting session to increase the capacity of the session. At least one of the session establishment occasion or the session modification occasion may be initiated by the core network, may be initiated by a user equipment according to actual needs or may be initiated by the access network. This is not limited in this embodiment. Any trigger condition is feasible in this embodiment.

The number of uplink addresses provided by the core network may be greater than or equal to the number of network element nodes coupled in the access network, so that in any session type, it can be ensured that the uplink addresses are enough for allocation. Of course, not all addresses in the uplink addresses provided by the core network are allocated by the access network. The access network determines the number of uplink addresses and the corresponding allocation mode according to at least one of the type of an established session or the type of a modified session. For example, if the type of the session is a splitting session, the number of uplink addresses needs to be greater than or equal to 2; if the type of the session is a non-splitting session, only one uplink address is needed. That is, at least part of the uplink addresses are used for being allocated among the network element nodes. At least part may be part or all of the at least two uplink addresses.

In response to determining that the session is a splitting session and the session is configured on at least two network element nodes, one uplink address is allocated to each of the at least two network element nodes configured with the session. In response to determining that the session is a non-splitting session and the session is configured on any one network element node, one uplink address is allocated to the any one network element node configured with the session. The expression "in response to determining that the session is a splitting session" means that the QoS flows of the session may interact with the core network through multiple network element nodes, thus the mode of allocating uplink addresses is that each of the at least two network element nodes configured with the session is allocated one uplink address. The expression "in response to determining that the session is a non-splitting session" means that the network element node configured with the session is allocated one uplink address.

The at least two network element nodes may include at least one master node and a network element node, except for the at least one master node, where the network element node is a secondary node. The at least two network element nodes configured with the session include one master node and at least one secondary node. That is, in the case where the session is a splitting session, the network element nodes configured with the session may include master node and secondary node. The uplink addresses may be allocated in the manner of random selection from uplink addresses, or may be allocated according to the "from master node to secondary node" order and the order in which multiple uplink addresses in the uplink addresses are ranked.

The at least two network element nodes may include at least one master node and a network element node, except for the at least one master node, where the network element node is a secondary node. The step in which the at least two uplink addresses sent by the core network are received includes a following step: the master node receives the at least two uplink addresses sent by the core network. The step in which the uplink-address allocation is performed among the at least two network element nodes composing the access network according to the at least two uplink addresses includes a following step: the master node performs the uplink-address allocation among the at least two network element nodes composing the access network according to the at least two uplink addresses. The step in which the downlink address is sent to the core network according to the allocation result includes a following step: the master node sends the downlink address to the core network according to the allocation result. That is, the access network performs the interaction of control signaling with the core network through the master node in the access network, and the control instruction of the secondary node is sent to the core network also through the master node.

Release notification information is sent to the core network. The release notification information includes identification information of an uplink address allocated to the network element node or identification information of an uplink address not allocated to the network element node. The release notification information is used for the core network to release the uplink address not allocated to the network element node. After the core network sends the uplink addresses to the access network and the access network performs the allocation, the access network does not necessarily use up all the uplink addresses sent by the core network. For the uplink addresses not used by the access network, the core network may release these uplink addresses for later use or for being used by other sessions. To learn the uplink addresses to be released, the core network may receive the release notification information sent by the access network. The release notification information may include the identification information of the allocated uplink address or the identification information of the not allocated uplink address. The identification information of the allocated uplink address may refer to the allocated uplink address itself or may refer to the identification information that may characterize the allocated uplink address. The same goes to the identification information of the not allocated uplink address. It is worth mentioning that, in the case where the access network sequentially allocates the uplink addresses sent by the core network to the at least two network element nodes in the access network, the core network can determine the allocated uplink address according to the usage of the downlink address in the access network sent by the access network, so that the core network can determine and then release the uplink address not allocated to the network element node, thereby saving network resources.

This embodiment provides the address allocation method to alleviate lack of the allocation scheme of uplink addresses between a core network and an access network in the related art. In at least one of the case of establishing a session or the case of modifying a session, the core network configures at least two uplink addresses and sends the at least two uplink addresses to the access network. The access network is a connectivity network formed by a coupling of at least two network element nodes. At least part of the at least two uplink addresses are used for being allocated among the at least two network element nodes. The access network receives the at least two uplink addresses sent by the core network and allocates the at least two uplink addresses among the at least two network element nodes composing the access network. The access network sends a downlink address to the core network according to an allocation result, and the core network receives the downlink addresses. Thus, allocation of uplink addresses is implemented between the core network and the access network formed by the coupling of the at least two network element nodes.

Figure 7:
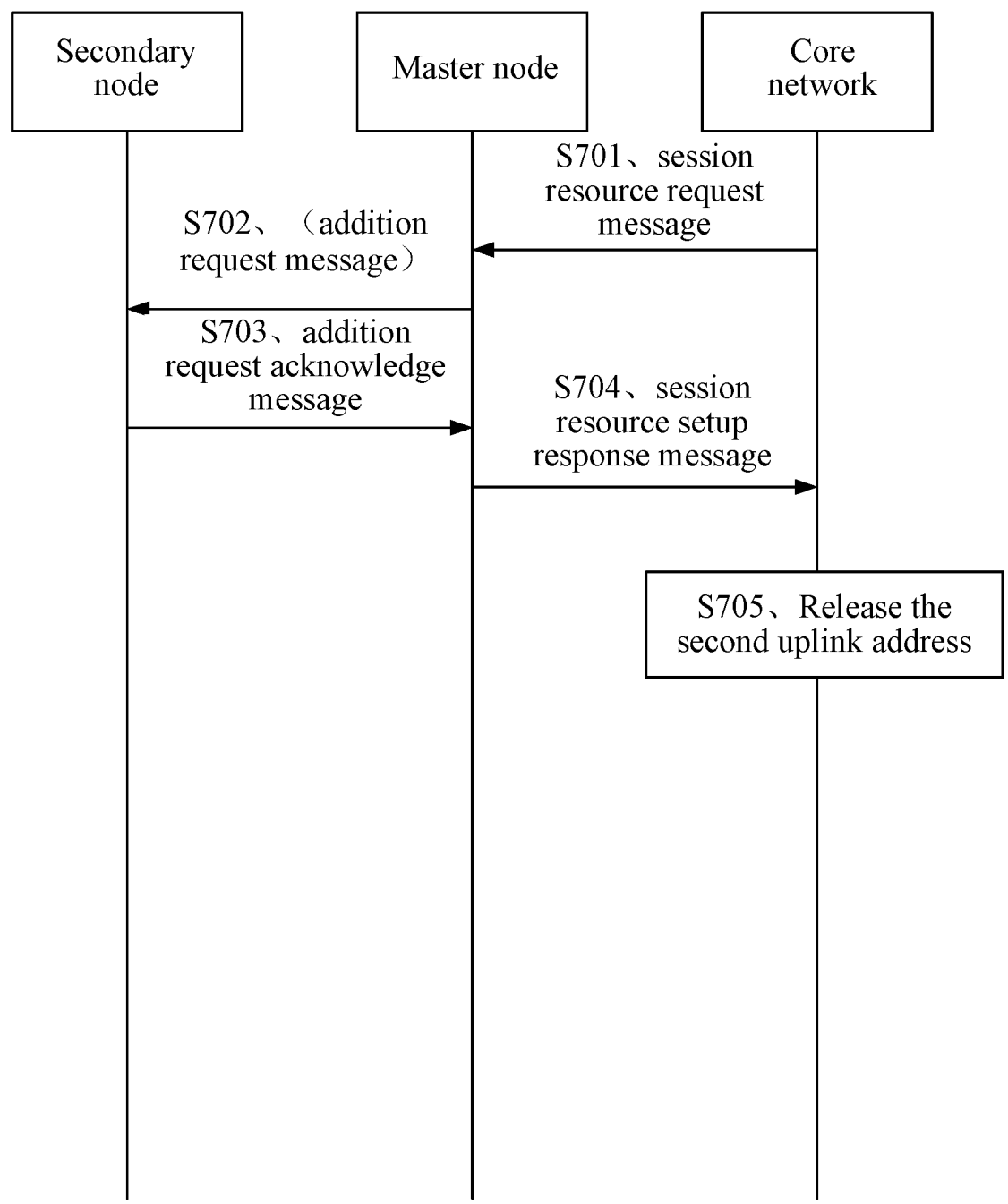
FIG. 7 is a signal flow diagram of an address allocation method according to an embodiment of the present application.

Referring to FIG. 7, FIG. 7 is a signal flow diagram of an address allocation method according to an embodiment of the present application. An access network, a dual-connectivity network, formed by a coupling of two network element nodes, a master node and a secondary node, is described by way of example. The address allocation method in this embodiment includes steps S701 to step S705.

In step S701, in the process of establishing a session between a core network and a radio access network, that is, in a PDU session resource setup procedure, an Access and Mobility Management Function (AMF) of the core network sends a PDU session resource request message to the access network. The request message includes two uplink addresses for the RAN to send uplink NG-U data. The RAN may use one or two of the uplink addresses to send the uplink NG-U data to the core network.

In step S702, the access network establishes the PDU session.

In the case where a type-1 session, that is, a splitting session, is established, the master node sends an SN addition request message to the secondary node. This message includes an uplink address (for example, UL NG-U GTP Tunnel Endpoint at UPF) forwarded by the master node to the secondary node and used by the secondary node to send the uplink NG-U data. This address is the second uplink address of the core network received by the master node. That is, the master node uses the first uplink address for itself and sends the second uplink address to the secondary node so that the secondary node may use the second uplink address.

In the case where a type-2 session, that is, a non-splitting session, is established and the session is configured on the master node, the master node does not need to send an SN addition request message to the secondary node. This is because all QoS flows of the session are at the master node itself. That is, in the type-2 session, Xn signaling interaction is not required between the master node and the secondary node.

In the case where a type-3 session, that is, a non-splitting session, is established and the session is configured on the secondary node, the master node sends an SN addition request message to the secondary node. This message includes an uplink address forwarded by the master node to the secondary node and used by the secondary node to send the uplink NG-U data. This address may be the first uplink address of the core network received by the master node.

In step S703, the secondary node sends an SN addition request acknowledge message to the master node except in the case of the type-2 session. This message includes the downlink address (for example, NG-U DL GTP Tunnel Endpoint at NG-RAN) of the secondary node. This downlink address is used for transmission of NG-U data.

In step S704, the master node sends a PDU session resource setup response message to the AMF of the core network. This message includes one or two downlink addresses of the NG-RAN and the one or two downlink addresses are used for transmission of downlink NG-U data from the core network to the access network.

(1) In the case where the access network establishes the PDU session as a type-1 session, that is, a splitting PDU session, the access network sends two downlink addresses to the core network, the downlink address (NG-U DL GTP Tunnel Endpoint at M-NG-RAN node) of the master node and the downlink address (NG-U DL GTP Tunnel Endpoint at S-NG-RAN node) of the secondary node. The two downlink addresses are used by the core network to send the downlink NG-U data to the master node and the secondary node. The downlink address of the master node corresponds to the first uplink address sent by the core network, and the downlink address of the secondary node corresponds to the second uplink address sent by the core network respectively. That is, the master node pairs the first uplink address with the downlink address of the master node and pairs the second uplink address with the downlink address of the secondary node.

(2) In the case where the access network establishes the PDU session as a non-splitting PDU session, the access network sends one downlink address to the core network. This downlink address is always paired with the first uplink address. This downlink address is described below.

In the case where the PDU session is a type-2 session, that is, a non-splitting PDU session terminated at MN, the access network sends the downlink address of the master node to the core network.

In the case where the PDU session is a type-3 session, that is, a non-splitting PDU session terminated at SN, the access network sends the downlink address of the secondary node to the core network.

In step S705, in the case where the core network receives one downlink address of the access network, the core network pairs the received downlink address with the first uplink address. In an embodiment, the core network may release the second uplink address.

Figure 8:
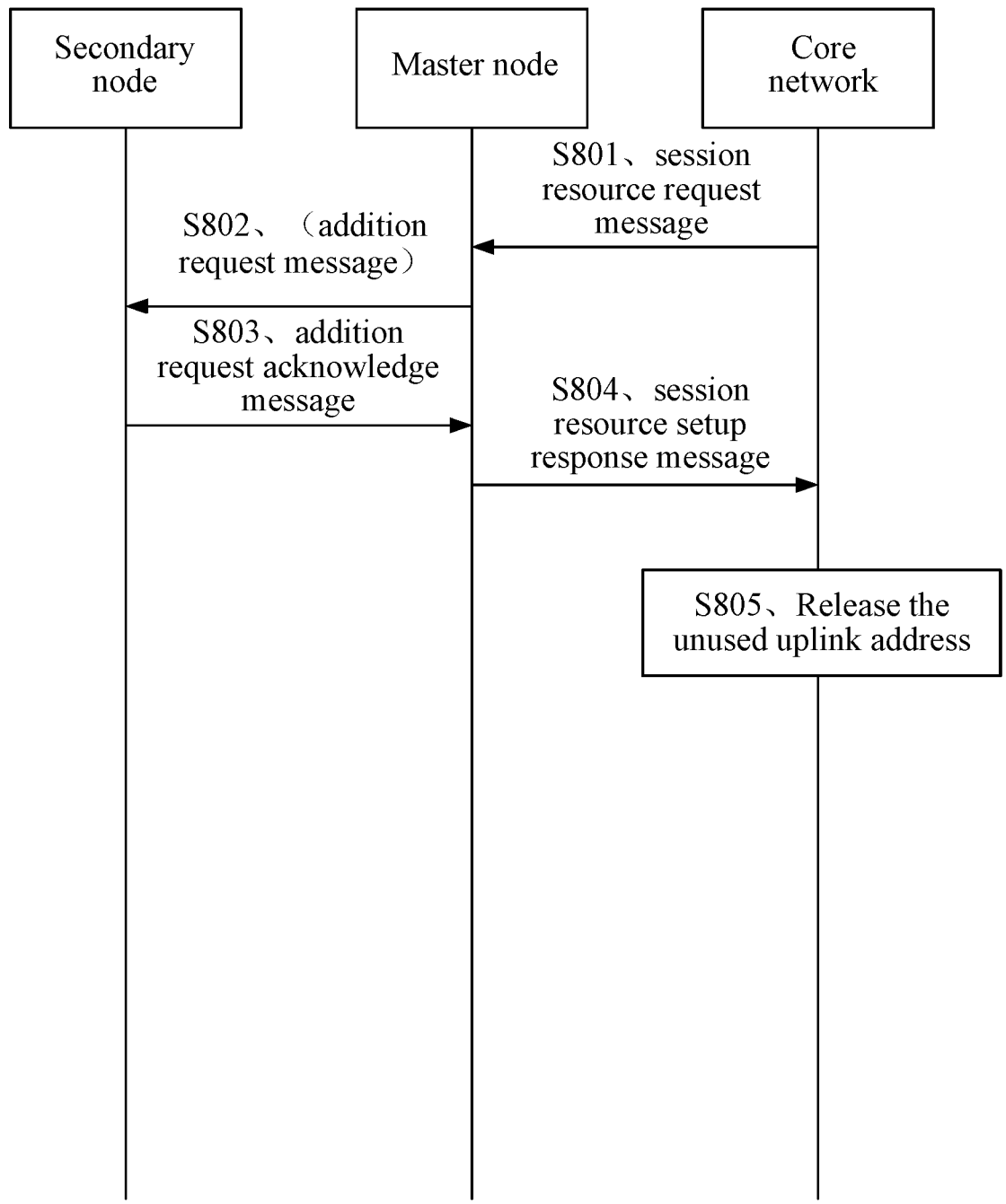
FIG. 8 is a signal flow diagram of an address allocation method according to another embodiment of the present application.

Referring to FIG. 8, FIG. 8 is a signal flow diagram of an address allocation method according to an embodiment of the present application. An access network, a dual-connectivity network, formed by a coupling of two network element nodes, a master node and a secondary node, is described by way of example. The address allocation method in this embodiment includes steps S801 to step S805.

In step S801, in the process of establishing a session between a core network and a radio access network, that is, in the session resource setup procedure, the AMF of the core network sends a PDU session resource request message to the access network. The request message includes two uplink addresses for the access network to send uplink NG-U data. The RAN may use one or two of the uplink addresses to send the uplink NG-U data to the core network.

In step S802, the access network establishes the PDU session.

In the case where a type-1 session is established and in the case where a type-2 session is established, the details are the same as embodiment four.

In the case where a type-3 session, that is, a non-splitting session, is established and the session is configured on the secondary node, the master node sends an SN addition request message to the secondary node. This message includes an uplink address forwarded by the master node to the secondary node and used by the secondary node to send the uplink NG-U data. This uplink address may be any one of the two uplink addresses of the core network received by the master node. That is, the master node forwards any one of the uplink addresses to the secondary node so that the secondary node may use the any one of the uplink addresses.

In step S803, the secondary node sends an SN addition request acknowledge message to the master node except in the case of the type-2 session. This message includes the downlink address (for example, NG-U DL GTP Tunnel Endpoint at the access network) of the secondary node. This downlink address is used for transmission of NG-U data.

In step S804, the master node sends a PDU session resource setup response message to the AMF of the core network. This message includes one or two downlink addresses of the access network and the one or two downlink addresses are used for transmission of downlink NG-U data from the core network to the RAN.

(1) In the case where the access network establishes the PDU session as a type-1 session, that is, a splitting session, as in embodiment four, the access network sends two downlink addresses to the core network, the downlink address (NG-U DL GTP Tunnel Endpoint at M-NG-RAN node) of the master node and the downlink address (NG-U DL GTP Tunnel Endpoint at S-NG-RAN node) of the secondary node. The two downlink addresses are used by the core network to send the downlink NG-U data to the master node and the secondary node. The downlink address of the master node corresponds to the first uplink address sent by the core network, and the downlink address of the secondary node corresponds to the second uplink address sent by the core network respectively. That is, the master node pairs the first uplink address with the downlink address of the master node and pairs the second uplink address with the downlink address of the secondary node.

(2) In the case where the access network establishes the PDU session as a non-splitting PDU session, the access network sends one downlink address and the uplink address used or the uplink address not used by the access network to the core network. That is, the master node pairs the allocated uplink address with this downlink address. This downlink address is described below.

In the case where the PDU session is a type-2 session, that is, a non-splitting PDU session terminated at MN, the access network sends the downlink address of the master node to the core network.

In the case where the PDU session is a type-3 session, that is, a non-splitting PDU session terminated at SN, the access network sends the downlink address of the secondary node to the core network, and the access network sends the uplink address used by the access network to the core network or sends the uplink address not used by the access network to the core network.

In step S805, when receiving one downlink address of the access network, the core network pairs the downlink address of the access network with the used uplink address. In an embodiment, the core network may release the not used uplink address.

Figure 9:
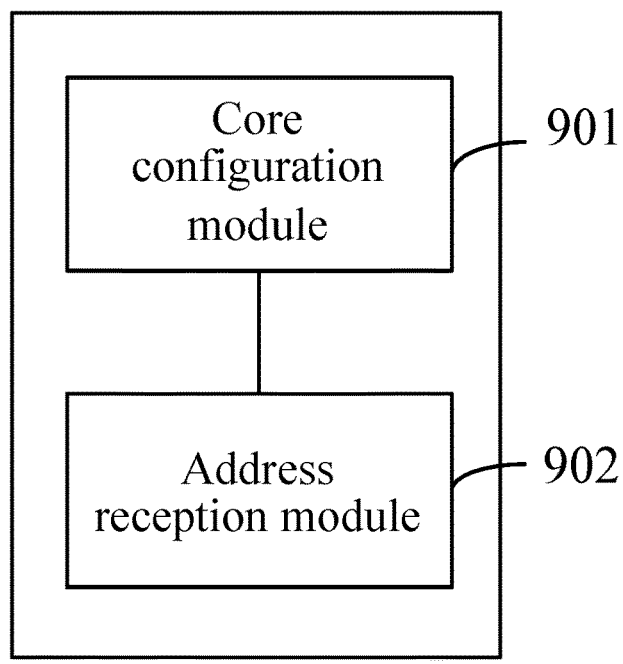
FIG. 9 is a schematic diagram illustrating composition of an address allocation apparatus according to an embodiment of the present application.

Referring to FIG. 9, FIG. 9 is a schematic diagram illustrating composition of an address allocation apparatus according to an embodiment of the present application. The apparatus includes a core configuration module 901 and an address reception module 902.

The core configuration module 901 is configured to, in at least one of the case of establishing a session or the case of modifying a session, configure at least two uplink addresses and send the at least two uplink addresses to an access network. The access network is a connectivity network formed by a coupling of at least two network element nodes. Part or all of the at least two uplink addresses are used for being allocated among the at least two network element nodes.

The address reception module 902 is configured to receive a downlink address sent by the access network and determine usage of the at least two uplink addresses and a correspondence between a used uplink address and the downlink address.

For the access network formed based on the connectivity network formed by a coupling of multiple network element nodes, not only session splitting is achieved, a non-splitting session can also be reserved. That is, in the access network, QoS flows of one session may also be processed through one uplink address of one network element node.

At least one of the case of establishing a session or the case of modifying a session means a trigger occasion of the address allocation method in this embodiment. The expression "in the case of establishing a session or the case of modifying a session" means that in the whole process of establishing a session or modifying a session, the steps of the address allocation method in this embodiment are performed. Establishing a session means creating a new session, such as a network request newly initiated by a user. This session does not exist in the previous network. Modifying a session means that the session existed before, but for some reasons, the type of the session or the related parameter of the session needs to be modified. The reasons include such a trigger occasion: due to network deterioration, it is needed to process the QoS flows of the session through only one network element node to improve stability, or due to an increase in the QoS flows of the session, it is needed to switch an originally non-splitting session to a splitting session to increase the capacity of the session.

In an embodiment, the operation of receiving the downlink addresses sent by the access network includes following operations: in response to determining that the session is a splitting session and the session is configured on at least two network element nodes, receiving the downlink address sent by the access network and used by the at least two network element nodes that have been allocated uplink addresses; and, in response to determining that the session is a non-splitting session and the session is configured on any one network element node, receiving the downlink address sent by the access network and used by the any one network element node that has been allocated an uplink address. The expression "in response to determining that the session is a splitting session" means that the QoS flows of the session may interact with the core network through multiple network element nodes. In this case, it is needed to determine, according to the network element nodes that have been allocated uplink addresses, the downlink addresses used by these network element nodes. These downlink addresses correspond to the uplink addresses used by these network element nodes. If the session is a non-splitting session, information interaction in the session is implemented through only one network element node of the access network and the downlink address used by this network element node needs to be determined according to this network element node. This downlink address corresponds to the uplink address used by this network element node.

In an embodiment, in response to determining that the session is a non-splitting session and the session is configured on any one network element node, the operation of receiving the downlink address used by the network element node may further include following operations: in response to determining that the session is a non-splitting session and the session is configured on a master node, receiving the downlink address used by the master node; and, in response to determining that the session is a non-splitting session and the session is configured on a secondary node, receiving the downlink address used by the secondary node.

In an embodiment, the operation of receiving the downlink address sent by the access network may further include a following operation: receiving the downlink address used by the network element node and the corresponding uplink address.

In an embodiment, the at least two network element nodes include at least one master node and a network element node, except for the at least one master node, where the network element node is a secondary node. The operation of sending the at least two uplink addresses to the access network includes an operation of sending the at least two uplink addresses to the master node. Correspondingly, the operation of receiving the downlink address sent by the access network includes an operation of receiving the downlink address sent by the master node. That is, the access network performs the interaction of control signaling with the core network through the master node, and the control instruction of the secondary node is sent to the core network also through the master node.

In an embodiment, after the operation of receiving the downlink address sent by the access network based on the uplink addresses, a following operation is further included: receiving release notification information sent by the access network, where the release notification information includes identification information of an uplink address allocated to the network element node or identification information of an uplink address not allocated to the network element node; and releasing, according to the release notification information, the uplink addresses not allocated to the network element node.

Figure 10:
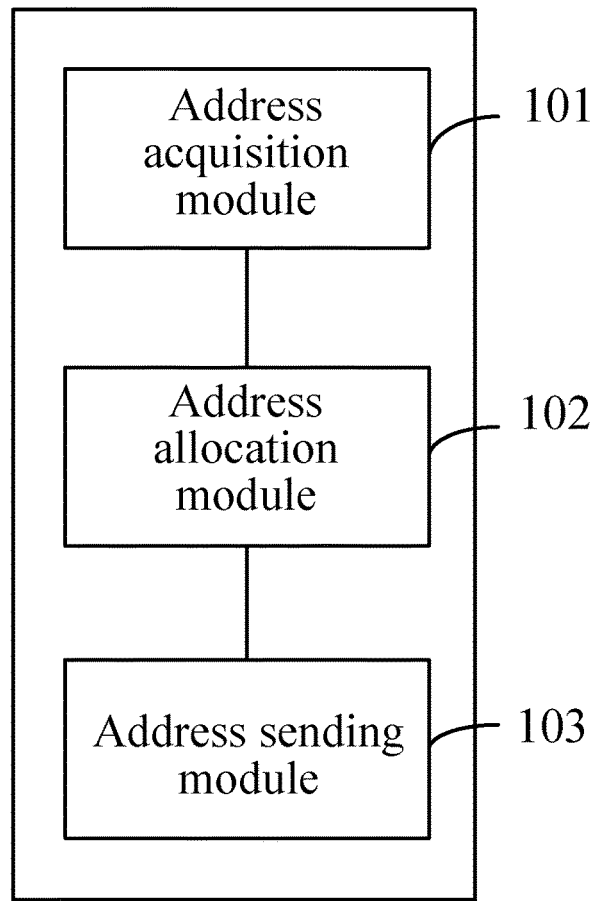
FIG. 10 is a schematic diagram illustrating composition of an address allocation apparatus according to another embodiment of the present application.

Referring to FIG. 10, FIG. 10 is a schematic diagram illustrating composition of an address allocation apparatus according to an embodiment of the present application. The apparatus includes an address acquisition module 101, an address allocation module 102 and an address sending module 103.

The address acquisition module 101 is configured to, in at least one of the case of establishing a session or the case of modifying a session, receive at least two uplink addresses sent by a core network.

The address allocation module 102 is configured to perform uplink-address allocation among network element nodes composing an access network according to the at least two uplink addresses. The access network is a connectivity network formed by a coupling of at least two network element nodes.

The address sending module 103 is configured to send a downlink address to the core network and determine usage of the at least two uplink addresses and a correspondence between a used uplink address and the downlink address.

In an embodiment, the operation of performing the uplink-address allocation among the network element nodes composing the access network according to the at least two uplink addresses includes following operations: in response to determining that the session is a splitting session and the session is configured on at least two network element nodes, allocating one uplink address to each of the at least two network element nodes configured with the session; and, in response to determining that the session is a non-splitting session and the session is configured on any one network element node, allocating one uplink address to the any one network element node configured with the session. The expression "in response to determining that the session is a splitting session" means that the QoS flows of the session may interact with the core network through multiple network element nodes, and the mode of allocating the uplink addresses is that each of the network element nodes configured with the session is allocated one uplink address. The expression "in response to determining that the session is a non-splitting session" means that the network element node configured with the session is allocated one uplink address.

In an embodiment, the mode of allocating one uplink address to a network element mode includes randomly selecting one uplink address from the at least two uplink addresses and performing allocation, or performing allocation according to an order in which the at least two uplink addresses are ranked.

In an embodiment, the at least two network element nodes include at least one master node and a network element node, except for the at least one master node, where the network element node is a secondary node. The at least two network element nodes configured with the session include one master node and at least one secondary node. That is, in the case where the session is a splitting session, the network element nodes configured with the session may include the master node and the secondary node. The uplink addresses may be allocated in the manner of random selection from uplink addresses, or may be allocated according to the "from master node to secondary node" order or the order in which the uplink addresses are ranked.

In an embodiment, a following operation may further be included: sending release notification information to the core network. The release notification information includes identification information of an uplink address allocated to the network element node or identification information of an uplink address not allocated to the network element node. The release notification information is used for the core network to release the uplink address not allocated to the network element node. After the core network sends the uplink addresses to the access network and the access network performs the allocation, the access network does not necessarily use up all the uplink addresses sent by the core network. For the uplink addresses not used by the access network, the core network may release these uplink addresses for later use or for being used by other sessions. To learn the uplink addresses to be released, the core network may receive the release notification information sent by the access network. The release notification information may include the identification information of the allocated uplink address or the identification information of the not allocated uplink address. The identification information of the allocated uplink address may refer to the allocated uplink address itself or may refer to the identification information that may characterize the allocated uplink address. The same goes to the identification information of the not allocated uplink addresses. It is worth mentioning that, in the case where the access network sequentially allocates the uplink addresses sent by the core network to the at least two network element nodes in the access network, the core network can determine the allocated uplink address according to the usage of the downlink address in the access network sent by the access network, so that the core network can determine and then release the uplink address not allocated to the network element node, thereby saving network resources.

In an embodiment, the at least two network element nodes may include at least one master node and a network element node, except for the at least one master node, where the network element node is a secondary node. The operation of receiving the at least two uplink addresses sent by the core network includes an operation that the master node receives the at least two uplink addresses sent by the core network. The operation of performing the uplink-address allocation among the at least two network element nodes composing the access network according to the at least two uplink addresses includes an operation that the master node performs the uplink-address allocation among the at least two network element nodes composing the access network according to the at least two uplink addresses. The operation of sending the downlink address to the core network according to the allocation result includes an operation that the master node sends the downlink address to the core network according to the allocation result. That is, the access network performs the interaction of control signaling with the core network through the master node, and the control instruction of the secondary node is sent to the core network also through the master node.

Figure 11:
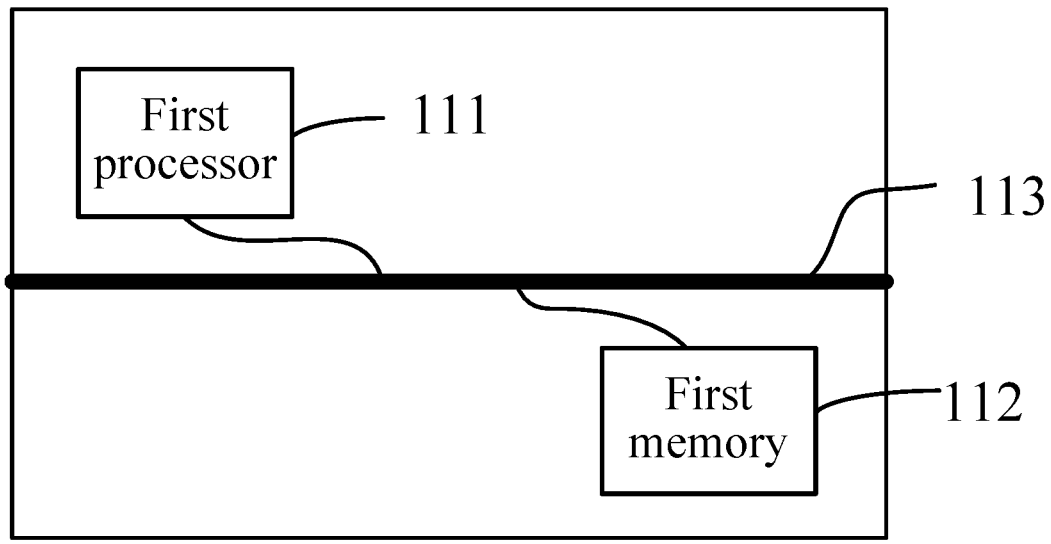
FIG. 11 is a schematic diagram illustrating composition of a core network according to an embodiment of the present application.

Referring to FIG. 11, FIG. 11 is a schematic diagram illustrating composition of a core network according to an embodiment of the present application. The core network includes a first processor 111, a first memory 112 and a first communication bus 113.

The first communication bus is configured to implement connection and communication between the first processor and the first memory.

An address allocation program is stored in the first memory 112. The first processor 111 is configured to execute the address allocation program stored in the first memory 112 to perform the steps of the address allocation method in the preceding embodiments, which is not repeated here.

Figure 12:
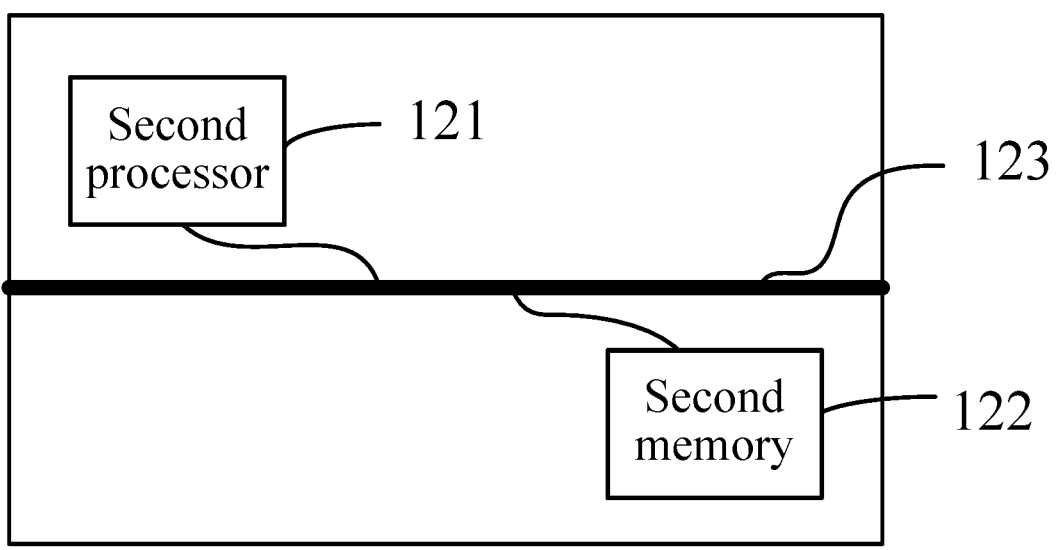
FIG. 12 is a schematic diagram illustrating composition of a network element node according to an embodiment of the present application.

Referring to FIG. 12, FIG. 12 is a schematic diagram illustrating composition of a network element node according to an embodiment of the present application. The network element node includes a second processor 111, a second memory 112 and a second communication bus 123.

The first communication bus is configured to implement connection and communication between the first processor and the first memory.

An address allocation program is stored in the second memory 142. The second processor 141 is configured to execute the address allocation program stored in the second memory 142 to perform the steps of the address allocation method in the preceding embodiments, which is not repeated here.

Figure 13:
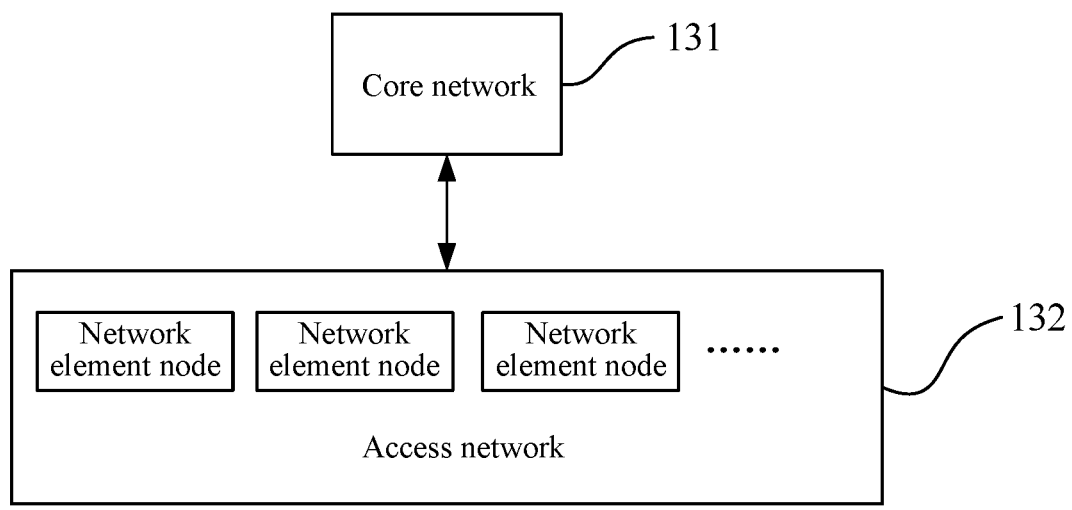
FIG. 13 is a schematic diagram illustrating composition of a network system according to an embodiment of the present application.

Referring to FIG. 13, FIG. 13 is a schematic diagram illustrating composition of a network system according to an embodiment of the present application. The network system includes a core network 131 and an access network 132. The access network 132 is a connectivity network formed by a coupling of at least two network element nodes.

In at least one of the case of establishing a session or the case of modifying a session, the core network 131 configures at least two uplink addresses and sends the at least two uplink addresses to the access network 132. Part or all of the at least two uplink addresses are used for being allocated among the at least two network element nodes.

The access network 132 receives the at least two uplink addresses sent by the core network 131 and performs uplink-address allocation among the at least two network element nodes composing the access network 132 according to the at least two uplink addresses.

The access network 132 sends a downlink address to the core network 131 and determines usage of the at least two uplink addresses and a correspondence between a used uplink address and the downlink address. Then the core network 131 receives the downlink address.

In an embodiment, the at least two network element nodes include at least one master node and a network element node, except for the at least one master node, where the network element node is a secondary node.

The access network 132 receives the at least two uplink addresses sent by the core network 131 in the following manner: the master node receives the at least two uplink addresses sent by the core network 131.

The access network 132 sends the downlink address to the core network 131 in the following manner: the master node sends the downlink address to the core network 131 according to the allocation result.

This embodiment provides a computer-readable storage medium storing at least one computer program. The at least one computer program is executable by at least one processor to perform the steps of the address allocation method in the preceding embodiments. Details are not repeated here.

It is to be understood by those skilled in the art that multiple modules or steps of the present application may be implemented by a generic computing device and may be concentrated on a single computing device or distributed in a network formed by multiple computing devices. For example, these modules or steps may be implemented by program codes executable by the computing device. Thus, these modules or steps may be stored in a storage medium such as a random-access memory (RAM), a read-only memory (ROM), a magnetic disk or an optical disk and executed by the computing device. Moreover, in some cases, the illustrated or described steps may be executed in a sequence different from the sequence described herein. Alternatively, each of these modules or steps may be implemented by being made into an integrated circuit module or multiple ones of these modules or steps may be implemented by being made into a single integrated circuit module. Therefore, the present application is not limited to any specific combination of hardware and software.

We claim:

1. An address allocation method, comprising:
   in a case of establishing a session, configuring at least two uplink addresses and sending the at least two uplink addresses to an access network, wherein the access network is a connectivity network formed by a coupling of at least two network element nodes and part of the at least two uplink addresses are used for being allocated among the at least two network element nodes, wherein a mode of allocating an uplink address to a network element node includes: randomly selecting one uplink address from the at least two uplink addresses and performing allocation, or performing allocation according to an order in which the at least two uplink addresses are ranked; and
   receiving at least one downlink address sent by the access network and determining usage of the at least two uplink addresses,
   receiving release notification information, wherein the release notification information comprises: identification information of an uplink address allocated to the at least two network element nodes; and releasing, according to the release notification information, an uplink address not allocated to the at least two network element nodes, wherein the session is a splitting session and the session is configured on the at least two network element nodes;

wherein the determining the usage of the at least two uplink addresses further comprises determining the usage of the at least two uplink addresses according to a preset mapping relation between uplink addresses and downlink addresses.

2. The address allocation method of claim 1, wherein receiving the at least one downlink address sent by the access network comprises:

receiving a downlink address sent by the access network and used by each network element node among the at least two network element nodes configured with the session.

3. A core network, comprising a processor, a memory and a communication bus, wherein the communication bus is configured to implement connection and communication between the processor and the memory; and an address allocation program is stored in the memory and the processor is configured to execute the address allocation program stored in the memory to perform the steps of the address allocation method of claim 2.

4. The address allocation method of claim 1, wherein the at least two network element nodes comprise at least one master node and a network element node, except for the at least one master node, wherein the network element node is a secondary node; and wherein the at least two network element nodes configured with the session comprise one master node and at least one secondary node.

5. The address allocation method of claim 1, wherein the at least two network element nodes comprise at least one master node and a network element node, except for the at least one master node, wherein the network element node is a secondary node;

wherein sending the at least two uplink addresses to the access network comprises: sending the at least two uplink addresses to the at least one master node; and wherein receiving the downlink address sent by the access network comprises: receiving the downlink address sent by the at least one master node.

6. The address allocation method of claim 1, further comprising determining a correspondence between a used uplink address and the downlink address.

7. A core network, comprising a processor, a memory and a communication bus, wherein the communication bus is configured to implement connection and communication between the processor and the memory; and an address allocation program is stored in the memory and the processor is configured to execute the address allocation program stored in the memory to perform the steps of the address allocation method of claim 1.

8. An address allocation method, comprising:

in a case of establishing a session, receiving at least two uplink addresses sent by a core network;

performing, according to part of the at least two uplink addresses, uplink-address allocation among a plurality of network element nodes composing an access network, wherein the access network is a connectivity network formed by a coupling of at least two network element nodes, and wherein the uplink-address allocation includes: randomly selecting one uplink address from the at least two uplink addresses and performing allocation, or performing allocation according to an order in which the at least two uplink addresses are ranked; and sending at least one downlink address to the core network, and determining usage of the at least two uplink addresses, sending release notification information, wherein the release notification information comprises identification information of an uplink address allocated to the at least two network element nodes, for the core network to release, according to the release notification information, an uplink address not allocated to the at least two network element nodes;

wherein the session is a splitting session and the session is configured on the at least two network element nodes;

wherein the determining the usage of the at least two uplink addresses further comprises determining the usage of the at least two uplink addresses according to a preset mapping relation between uplink addresses and downlink addresses.

9. The address allocation method of claim 8, wherein performing, according to the at least two uplink addresses, the uplink-address allocation among the plurality of network element nodes composing the access network comprises:

allocating one of the at least two uplink addresses to each network element node among the at least two network element nodes configured with the session.

10. The address allocation method of claim 9, wherein the at least two network element nodes comprise at least one master node and a network element node, except for the at least one master node, wherein the network element node is a secondary node; and the at least two network element nodes configured with the session comprise one master node and at least one secondary node.

11. A network element node, comprising a processor, a memory and a communication bus, wherein the communication bus is configured to implement connection and communication between the processor and the memory; and an address allocation program is stored in the memory and the processor is configured to execute the address allocation program stored in the memory to perform the steps of the address allocation method of claim 9.

12. The address allocation method of claim 8, wherein the at least two network element nodes comprise at least one master node and a network element node, except for the at least one master node, wherein the network element node is a secondary node;

wherein receiving the at least two uplink addresses sent by the core network comprises: receiving, by the at least one master node, the at least two uplink addresses sent by the core network; and wherein sending the downlink address to the core network comprises: sending, by the at least one master node, the downlink address to the core network.

13. The address allocation method of claim 8, further comprising determining a correspondence between a used uplink address and the downlink address.

14. A network element node, comprising a processor, a memory and a communication bus, wherein the communication bus is configured to implement connection and communication between the processor and the memory; and an address allocation program is stored in the memory and the processor is configured to execute the address allocation program stored in the memory to perform the steps of the address allocation method of claim 8.

\* \* \* \* \*